3,352,753
**PHARMACEUTICAL COMPOSITIONS OF CORTICO-
STEROIDS IN GELLED ALCOHOL**
Leonard J. Lerner, New Brunswick, N.J., assignor, by mesne assignments, to E. R. Squibb & Sons, Inc., New York, N.Y., a corporation of Delaware
No Drawing. Filed Mar. 19, 1965, Ser. No. 441,300
3 Claims. (Cl. 167—77)

This invention relates to and has for its object the provision of new physiologically active compositions. More particularly, this invention relates to compositions for topical application having incorporated therein as the principal active ingredient a corticosteroid.

Heretofore, corticosteroids have been administered in the treatment of topical dermatological disorders in vehicles which have not proven to be completely satisfactory. The vehicles which have been employed for this purpose include creams, lotions, suspensions and sprays. It has been found that these formulations are unsatisfactory because they do not provide an adequate vehicle for the therapeutic agent, requiring excessive amounts thereof to be employed; or they fail to carry the therapeutic agent to the site required as they do not, to any extent, penetrate the skin. In addition to the foregoing disadvantages, the presently employed topically administrable corticosteroid compositions are difficult, uncomfortable and awkward to apply.

It has now been discovered, that the disadvantages heretofore present in the topically administrable corticosteroid preparations can be overcome by the present invention. The compositions of the instant invention permit the therapeutic agent to reach the site of action quickly and efficiently, thus requiring less of a concentration of active ingredient. In addition, the compositions of the instant invention are simply, comfortably and neatly applied.

The compositions of the instant invention require a corticosteroid as the active ingredient. It is preferred in the practice of this invention to employ triamcinolone acetonide as the active ingredient. In the practice of this invention, satisfactory results are obtained when the active ingredient is present in a concentration of from 0.01 to about 0.1% by weight of the final compositions of this invention.

The desired active ingredient of this invention is intimately blended with, and dispersed throughout, the novel vehicle of this invention. The compositions of this invention are prepared by intimately mixing the desired active ingredient in warm ethyl alcohol, having dissolved therein gelling agents, for example, sodium stearate, glyceryl monostearate, sodium palmitate, sodium laurate and mixtures thereof, and allowing said compositions to cool to room temperature. Upon cooling, the warm ethyl alcohol compositions form gels which may be shaped into desired forms for direct topical application, or alternatively, the same results may be obtained by introducing the said warmed ethyl alcohol solutions into molds, allowing them to cool, and removing the thus molded gelled compositions.

The gelled compositions of the instant invention may be prepared as hereinabove described, employing from about 75 to about 98% by weight of ethyl alcohol and preferably from about 90 to about 96% by weight. The gelling agents employed in the practice of this invention may be present in the final compositions in a concentration of from about 2 to about 25% by weight and preferably from about 4% to about 10% by weight.

The corticosteroid-ethyl alcohol-gelling agent compositions may be employed directly or they may have incorporated therein certain other ingredients, for example, anti-oxidants, such as butylated hydroxy anisole, and other like ingredients, for example, perfume, colorants, and so forth. In addition, if desired, additional active ingredients, for example, a local anesthetic, such as zenzocaine, may also be incorporated into the final compositions. These additional ingredients are added to the warm ethyl alcohol solution prior to their being allowed to cool and form gels.

The gelled compositions of this invention may be applied directly upon the area to be treated and may be employed in the topical treatment of such conditions as dermatitis, insect bites, and infantile eczema.

The following examples are illustrative of the instant invention:

EXAMPLE 1

Ninety cubic centimeters of ethyl alcohol are gently heated and the following ingredients are intimately blended therewith:

| | Grams |
|---|---|
| Triamcinolone acetonide | 0.01 |
| Sodium stearate | 6.0 |
| Cetyl alcohol | 2.0 |
| Glyceryl monostearate | 2.0 |
| Camphor | 0.1 |
| Stearic acid | 0.5 |
| Perfume | 0.4 |
| Propylene glycol | 8.0 |
| Distilled water to make | 100.0 |

The warmed composition is then poured into cylindrical molds and allowed to cool to room temperature. Upon cooling, the resultant gelled compositions are removed from the molds, packaged and stored for future topical use.

EXAMPLE 2

The procedure of Example 1 is followed, except that an equivalent amount of benzocaine is employed in place of the perfume.

The invention may be variously otherwise embodied within the scope of the appended claims.

What is claimed is:
1. A topically administrable composition comprising a corticosteroid intimately blended with ethyl alcohol and gelling agents.
2. A topically administrable pharmaceutical composition comprising from about 0.01% to about 0.1% of triamcinolone acetonide intimately blended into from about 75% to about 98% of ethyl alcohol having incorporated therein from about 2% to about 25% of a gelling agent selected from the group consisting of sodium stearate, glyceryl monostearate sodium palmitate, sodium laurate and mixtures thereof.
3. The composition of claim 2 having incorporated therein a small but effective amount of benzocaine.

References Cited

UNITED STATES PATENTS

| | | | |
|---|---|---|---|
| 3,073,743 | 1/1963 | Spero | 167—63 |
| 3,103,466 | 9/1963 | Farkas | 167—63 |

OTHER REFERENCES

American Drug Index for 1956, p. 82.
New and Nonofficial Drugs for 1960, pp. 551–554.

ALBERT T. MEYERS, *Primary Examiner.*

JULIAN S. LEVITT, *Examiner.*

L. B. RANDALL, *Assistant Examiner.*